United States Patent
RJ et al.

(10) Patent No.: US 11,966,775 B2
(45) Date of Patent: Apr. 23, 2024

(54) CLOUD NATIVE ADAPTIVE JOB SCHEDULER FRAMEWORK FOR DYNAMIC WORKLOADS

(71) Applicant: SAP SE, Walldorf (DE)

(72) Inventors: Prasanth RJ, Bengaluru (IN); Shivkumar Chakkenchath, Bengaluru (IN); Suren Raju, Bengaluru (IN); Devadas KV, Bengaluru (IN); Mukta Sriram Gudlavalleti, Bengaluru (IN)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 17/109,042

(22) Filed: Dec. 1, 2020

(65) Prior Publication Data

US 2022/0171653 A1 Jun. 2, 2022

(51) Int. Cl.
*G06F 9/48* (2006.01)
*G06F 9/50* (2006.01)

(52) U.S. Cl.
CPC .......... *G06F 9/4881* (2013.01); *G06F 9/5027* (2013.01); *G06F 9/5083* (2013.01)

(58) Field of Classification Search
CPC ..... G06F 9/4881; G06F 9/5027; G06F 9/5083
See application file for complete search history.

(56) References Cited

U.S. PATENT DOCUMENTS 9,152,918 B1 * 10/2015 McNair .................. G06N 7/005
9,304,817 B2 * 4/2016 Kim ....................... G06F 9/5038
11,311,722 B2 * 4/2022 Shazly ................... A61K 38/14
2020/0379816 A1 * 12/2020 Lin ........................ G06F 9/5072
2021/0105228 A1 * 4/2021 Joseph ................. G06K 9/6256
2021/0255899 A1 * 8/2021 Chen ....................... G06N 3/04

OTHER PUBLICATIONS

Kumar et al. "Forecasting HPC workload using ARMA models and SSA." 2016 International Conference on Information Technology (ICIT). IEEE, pp. 294-297. (Year: 2016).*

Mohit Dhingra et al. "Elasticity in IaaS Cloud, preserving performance SLAs", Thesis, Supercomputer Education and Research Centre Indian Institute of Science Bangalore, 560 012, India, pp. 1-152. (Year: 2014).*

Rao et al. "Time Series Forecasting methods suitable for prediction of CPU usage." 2019 4th International Conference on Computational Systems and Information Technology for Sustainable Solution (CSITSS). vol. 4. IEEE, pp. 1-5 (Year: 2019).*

* cited by examiner

*Primary Examiner* — Michael W Ayers
*Assistant Examiner* — Willy W Huaracha
(74) *Attorney, Agent, or Firm* — Klarquist Sparkman, LLP (57) ABSTRACT

A request to execute a recurring job is received by a cloud computing environment. Thereafter, available computing resources available to execute the job are determined based on historical resource consumption trends. A resource prediction for the job is then generated using an ensemble model ((S)ARIMA model) that combines an autoregressive moving average (ARMA) model and an autoregressive moving average (ARIMA) prediction models. The resource prediction characterizes resources to be consumed for successfully executing the job. Execution of the job can then be scheduled by the cloud computing environment based on the resource prediction and the available computing resources. Related apparatus, systems, techniques and articles are also described.

20 Claims, 6 Drawing Sheets

CLOUD NATIVE ADAPTIVE JOB SCHEDULER FRAMEWORK FOR DYNAMIC WORKLOADS

TECHNICAL FIELD

The subject matter described herein relates to cloud computing resource management techniques for optimized allocation of resources for a set of jobs to be executed concurrently based on historical resource benchmarks.

BACKGROUND

With more applications moving to enterprise clouds, there is a significant increase in demand for CPU (i.e., computing resources, etc.), memory, network bandwidth and storage in cloud datacenters. Current challenges in cloud architectures include scenarios during which multiple customers simultaneously schedule dynamic loads with standard configurations that result in service degradation and potential service disruptions. As such, cloud architectures are increasingly using elastic job scheduling frameworks to ensure that a desired level of quality of service is maintained when running on-demand or scheduled jobs. In a multi-tenanted software-as-a-service (SAAS) environment where multiple customers share a common job scheduler framework, decisions concerning priority of jobs and job frequency can, at times, create an unanticipated volumes of jobs that can negatively affect the quality of service for all customers in the datacenter.

SUMMARY

In a first aspect, a request to execute a recurring job is received by a cloud computing environment. Thereafter, available computing resources available to execute the job are determined based on historical resource consumption trends. A resource prediction for the job is then generated using an ensemble model ((S)ARIMA model) that combines an autoregressive moving average (ARMA) model and an autoregressive moving average (ARIMA) prediction models. The resource prediction characterizes resources to be consumed for successfully executing the job. Execution of the job can then be scheduled by the cloud computing environment based on the resource prediction and the available computing resources.

The determined computing resources can include availability of one or more of: central processing unit (CPU), memory, disk storage, or I/O.

The historical information can be retrieved using job meta information associated with the job.

The scheduling can include requesting a new job execution instance to execute the job with the generated resource prediction.

The job can be executed by one or more servers forming part of a cloud computing environment. The cloud computing environment can serve a plurality of tenants such that jobs from a particular tenant are executed within one or more containers isolated from other tenants.

A request can also be received to execute a new job that was not previously executed. The new job can be scheduled and resource consumption during execution can be monitored and saved to a persistence layer such as a TSDB (time series database).

The scheduling of the job type with non-seasonal bias can use an ARIMA model.

Job meta information can be updated based on the monitored resource consumption during execution of the new job. The meta information can be used to predict resource consumption at a subsequent time when the new job is requested to be executed.

In an interrelated aspect, a plurality of requests to execute recurring jobs within a cloud computing environment are received. Thereafter, computing resources available to execute each job are determined. Historical computing resource consumption information is then retrieved for each recurring job. A resource prediction is then generated for each recurring job using an ensemble model ((S)ARIMA model) combining an autoregressive moving average (ARMA) model and an autoregressive moving average (ARIMA) models. The respective resource predictions characterize resources to be consumed when executing such jobs based on the corresponding determined computing resources and the corresponding retrieved historical information. Subsequently, a plurality of batches of jobs are generated based on the resource predictions for the jobs and the available computing resources. Execution of the plurality of batches of jobs can then be scheduled by the cloud computing environment.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for predicting resources that will be consumed when executing jobs to avoid over provisioning resources to handle such jobs. These predictions in turn, can be used, to more efficiently schedule and execute jobs within a cloud computing environment.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to enhanced techniques for predicting optimal resources used by a cloud computing environment when executing jobs.

Figure 1:
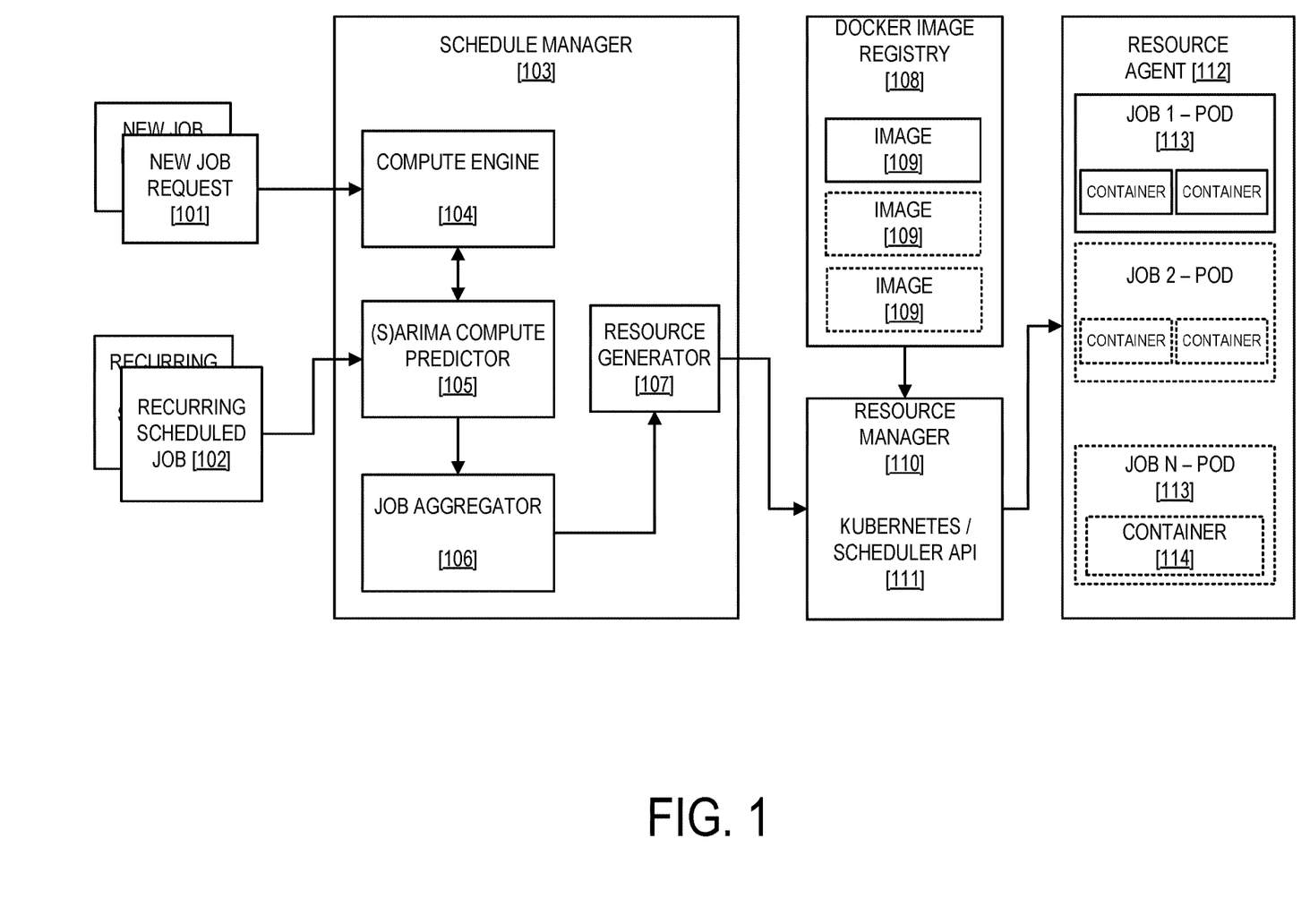
FIG. 1 is a diagram illustrating a computing architecture providing a cloud-based elastic job scheduling framework.

With reference to architecture diagram 100 of FIG. 1, jobs can be classified into two types: new job requests 101 and recurring jobs 102 which are scheduled with predefined frequency. Jobs can be submitted to a schedule manager 103 for classification as either being new or recurring. All new job requests 101 with a unique job type (i.e., a job type that had not previously been executed) can be executed in a dedicated container on a Kubernetes node to estimate or otherwise monitor compute resource requirements. Maximum threshold values for CPU, memory, network and disk utilization can be recorded by a resource monitor 207 for new job types during initial executions. These samples can be recorded over a period based on scheduled frequency to ensure enough data points are available for training a (S)ARIMA compute predictor 105 for a given job type.

Compute and run-time resource requirements for a given job type can be captured by metric agents (e.g., statd, collectd, etc.) which periodically poll the underlying operating system with a process ID during execution of a job. The resource consumption metric data points can be stored in a time series databases (TSDB) such as influx-db or Elastic search indexes for persistence and historical analysis by a (S)ARIMA compute predictor 105. For jobs for where the compute resource has yet to be determined by the (S)ARIMA compute predictor 105, compute engine 104 can create a resource deployment manifest in which resource specifications are defined by job provisioning teams based on metadata associated with the job. These manifests can be used to create runtime containers of defined characteristics for initial executions.

Figure 2:
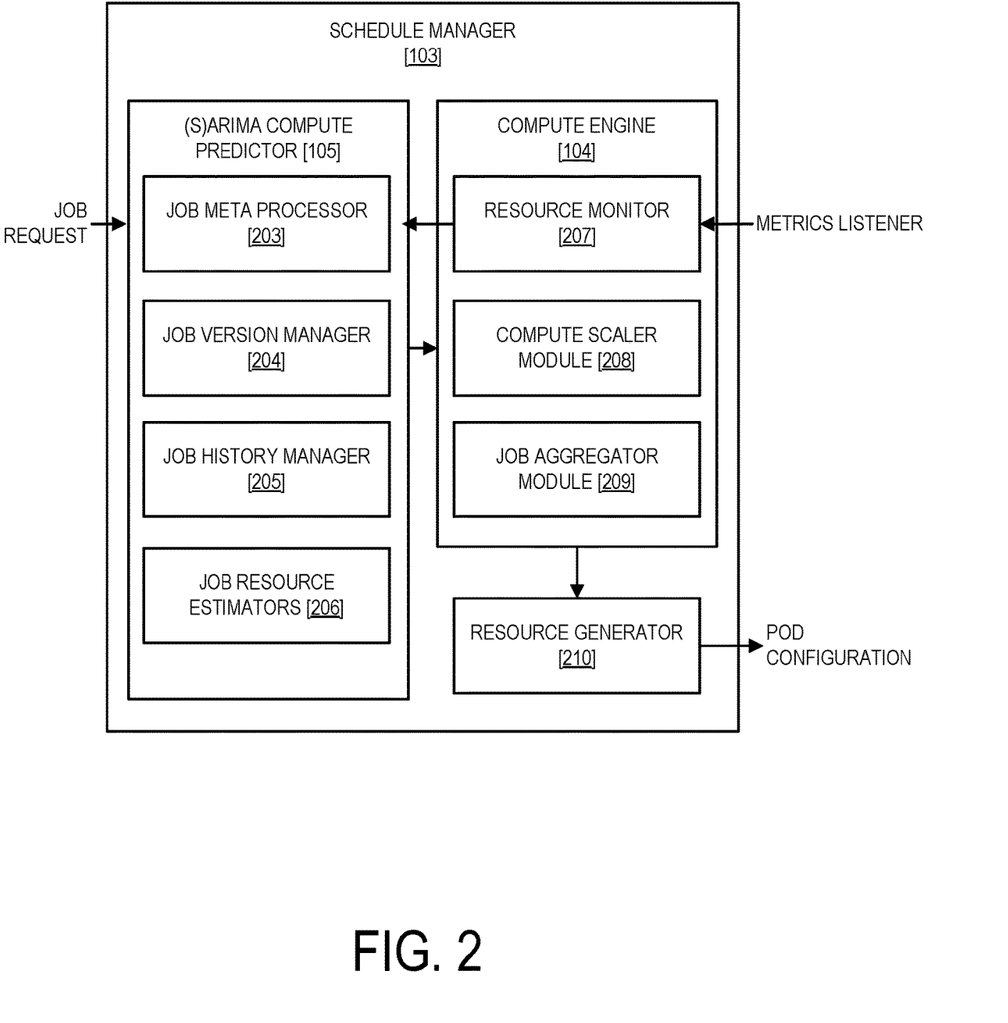
FIG. 2 is a diagram illustrating aspects of a schedule manager module.

FIG. 2 is a diagram 200 which references key components of the compute engine 104 and the (S)ARIMA compute predictor 105. The (S)ARIMA compute predictor 105 can be trained based on metric data from historical executions and can provide key insights into resource estimation for a given job type based on factors such as customer, job frequency and job recurrence. Job meta processor 203 can parse job information from metadata to identify attributes of a job such as type, frequency, priority (if a job is seasonal in nature). Every job can be identified by a unique key job tracker ID 302 that can be used to store various resource metrics for the job in a time series database (TSDB) (for subsequent querying, etc.). Every time a job is scheduled to run, the runtime metrics from execution are captured by an event framework that logs application and system metrics in the TSDB for future modelling and prediction. Details for jobs can be versioned and maintained by a developer team during initial provisioning of a job or during upgrading of an existing job. Job history manager 205 can store historical information of changes done to specific jobs and a job version manager 204 can maintain backward compatibility and metrics on historical job versions. Compute engine 104 is a core module which can create resource deployment descriptors based on prediction data provided from the (S)ARIMA compute predictor 105. For better optimization and run time efficiency, jobs can be bundled as batches and scheduled for execution in cloud in such bundles. Job aggregator module 209 can create list of jobs which can be bundled together on one execution node.

Resource aggregation and calibration can be provided by a compute scaler module 208 which can determine optimal CPU and memory requirements for each job. Resource monitor 207 is an agent in the compute engine 104 which can relay information from execution nodes using Kubernetes scheduler API 111 to the TSDB which, in turn, can be used for prediction model data training. Once a list of jobs planned for a given time window are computed and packaged in multiple stacks, the aggregated requirement for compute and capacity is requested by resource generator 201 from the resource manager 110. The resource manager 110 can deploy job nodes to the Kubernetes scheduler API 11 using job execution images 109 from docker image antifactory/registry 108.

Figure 3:
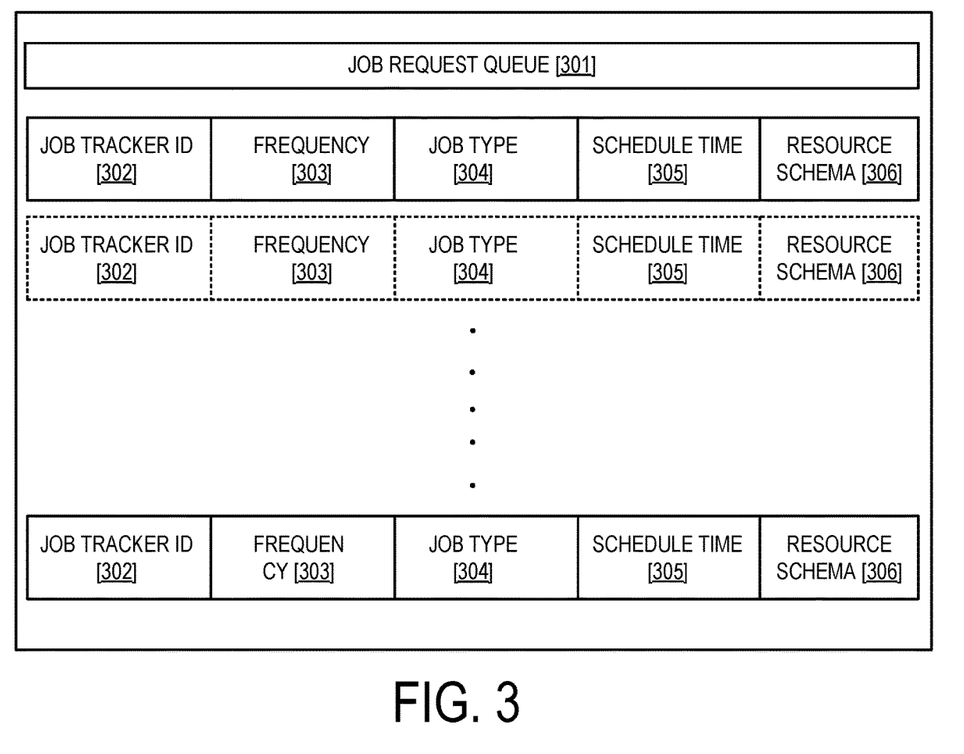
FIG. 3 is a diagram providing a graphical representation of a job request queue with metadata information.

With reference to diagram 300 of FIG. 3, incoming and recurring jobs received by the cloud computing environment can be queued within a job request queue 301 prior to execution. Metadata information relating to the jobs can form part of the queue 301 such as job tracker ID 302 (a unique ID for that type of job), frequency 303 (which refers to how often the particular job type is executed), job type 304 (which characterizes the job), schedule time 305 (which characterizes when the job is scheduled to be executed), and resource schema 306 (which specifies historical resource consumption). The job metadata can be provided by the developers and can characterize the technical specifications of a job as well as other aspects such as scheduling, recurring frequency, priority etc. The resource schema 306 provides estimated resource metrics such as CPU, memory, disk and network I/O based on historical activity for a given tenant (forming part of a multi-tenant cloud computing environment). Tenant in this regard can refer to a group of client devices forming part of a single company or other enterprise. Resource metrics for some job types can correlate to tenant size which can be updated as a weighted co-efficient based on tenant size in job request metadata. For example, a data extraction job from a small tenant might usually require X GB of data for a full data load with 20 k records while the same job for a large tenant with 100K records might require 5X GB which can be represented as 0.2X for the small tenant and X for the large tenant.

The computational requirements for job types which are based on tenant requirements as well as jobs that are seasonal in nature or otherwise recurring can be modeled. With most types of recurring/seasonal jobs, the computational requirements for jobs can be fitted on time series data with 95% confidence. Time series data can have many forms and represent different stochastic processes. The current subject matter utilizes two linear time series models, namely, Autoregressive (AR) and Moving Average (MA) models for time series prediction. Combining these two, the Autoregressive Moving Average (ARMA) and Autoregressive Integrated Moving Average (ARIMA) models can provide more precise resource consumption metrics.

Jobs which are uniform and not seasonal in nature can be processed with non-seasonal ARIMA models which are denoted as ARIMA(p,d,q) in which parameters p, d, and q are non-negative integers, p is the order (number of time lags) of the autoregressive model, d is the degree of differencing (the number of times the data have had past values subtracted), and q is the order of the moving-average model. In this regard, uniform refers to jobs in which the demand for execution is independent of time and usually only have a trend that needs to be captured. Seasonal, in this regard, refers to jobs that have high frequency or demand usually during a month or calendar week based on business needs. For example, a job that captures employee clock-in/clock-out timestamps is scheduled to run every day while, in contrast, payroll jobs and benefits might be computed on a calendar week or month basis.

In an AR(p) model, the future value of a variable is assumed to be a linear combination of (p) past observations and a random error (E) together with a constant term. Mathematically AR(p) can be represented as:

$$y_t = c + \sum_{i=1}^{p} \varphi_i y_{t-i} + \varepsilon_t = c + \varphi_1 y_{i-1} + \varphi_2 y_{i-2} + \ldots + \varphi_p y_{i-p} + \varepsilon_i$$

Here t (y) and t (ε) are respectively the actual value and random error at time period t, φ (i) (i=1, 2, ..., p) are model parameters and c is a constant. Just as an AR(p) model regress against past values of the series, an MA(q) model uses past errors as the explanatory variables. The MA(q) model is given by $$y_i = \mu + \sum_{j=1}^{q} \theta_j \varepsilon_{i-j} + \varepsilon_i = \mu + \theta_1 \varepsilon_{i=1} + \theta_2 \varepsilon_{i-2} + \ldots + \theta_q \varepsilon_{i=q} + \varepsilon_i$$

Here μ is the mean of the series, (j 1, 2, ..., q)θj=are the model parameters and q is the order of the model.

Autoregressive (AR) and moving average (MA) models can be combined to form a general and useful class of time series models, known as ARMA models. Mathematically an ARMA(p, q) model is represented as $$y_i = c + \varepsilon_i + \sum_{i=1}^{p} \varphi_i y_{i-1} + \sum_{j=1}^{q} \theta_j \varepsilon_{i=j}$$

ARMA models are manipulated using the lag operator notation. The lag or backshift operator is defined as Ly(t)=y(t−1).

Polynomials of lag operator or lag polynomials are used to represent ARMA models as follows $$AR(p) \text{ model: } \varepsilon_i = \varphi(L)y_i.$$

$$MA(q) \text{ model: } y_i = \theta(L)\varepsilon_i.$$

$$ARMA(p, q) \text{ model: } \varphi(L)y_i = \theta(L)\varepsilon_i.$$

Here $\varphi(L) = 1 - \sum_{i=1}^{p} \varphi_i L^i$ and $\theta(L) = 1 + \sum_{j=1}^{q} \theta_i L_i$.

In ARIMA models, a non-stationary time series is made stationary by applying finite differencing of the data points. The mathematical formulation of the ARIMA(p,d,q) model using lag polynomials is given below $$\varphi(L)(1-L)^d y_i = \theta(L)\varepsilon_i, \text{ i.e.}$$

$$\left(1 - \sum_{i=1}^{p} \varphi_i L^i\right)(1-L)^d y_i = \left(1 + \sum_{j=1}^{q} \theta_j L^j\right)\varepsilon_i$$

In the above equation p, d and q are integers greater than or equal to zero and refer to the order of the autoregressive, integrated, and moving average parts of the model respectively. The integer d controls the level of differencing. Generally, d=1 is enough for most cases. When d=0, then it reduces to an ARMA(p,q) model.

The resource consumption for jobs which are seasonal can be predicted with seasonal ARIMA models (referred to herein as (S)ARIMA). The seasonable model can be denoted herein as ARIMA(p,d,q)(P,D,Q)s, where s refers to the number of periods in each season, and the uppercase P,D,Q refer to the autoregressive, differencing, and moving average terms for the seasonal part of the ARIMA model. (S)ARIMA Compute predictor 105 can process each job request in the request queue 301 and based on the seasonality of the request (or lack thereof), apply either the ARIMA or (S)ARIMA model to predict compute resource metrics. These compute resource metrics can be published to compute engine 203 which can be used for a final configuration in a POD (i.e., container) deployment descriptor this is important to ensure capacity is allocated for each POD in given schedule.

With (S)ARIMA, seasonal differencing of an appropriate order is used to remove non-stationarity from the series. A first order seasonal difference is the difference between an observation and the corresponding observation from the previous year and is calculated as $z_t=y_t-y_{t-1}$ For monthly time series, s=12 and for quarterly time series, s=4. This model is termed as the (S)ARIMA(p, d, q)×(P, D, Q)s model.

(P, D, Q)—represents the (p,d,q) for the seasonal part of the time series

Here $z_t$ is the seasonally differenced series

Figure 4:
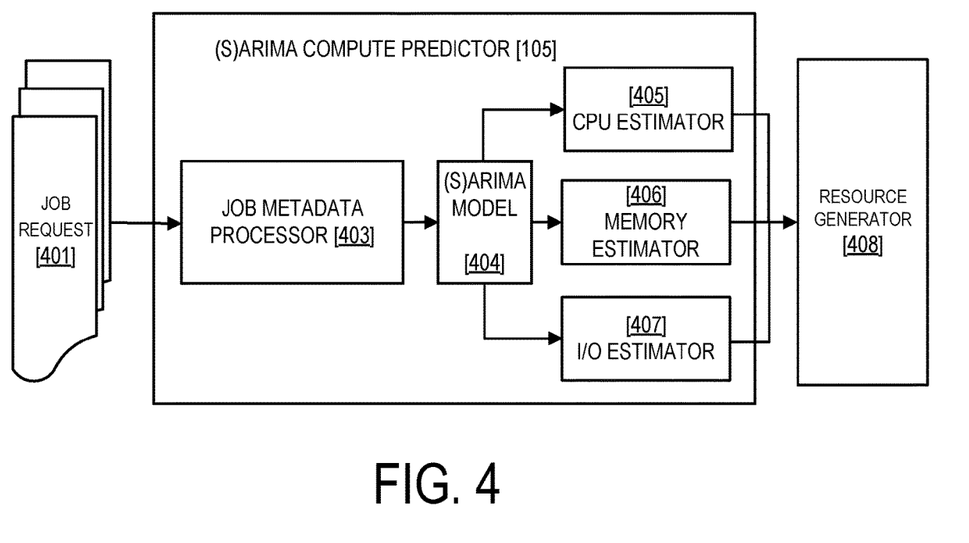
FIG. 4 is a diagram illustrating functional components of a (S)ARIMA prediction module for resource estimation.

FIG. 4 is a diagram 400 illustrating functional components used for resource prediction estimates for each job request 401. Jobs can be of different natures and there can be different scenarios based on job type in which resource consumption can be heavily skewed for memory or compute consumption. A CPU estimator 405 model can be used for predicting compute requirements (i.e., processor usage, etc.) for a given job based on historical executions. Memory estimator model 406 can be used to predict memory requirements for jobs based on historical memory metric trends from a TSDB. Jobs utilizing in-memory functions of an in-memory database generally require significant amounts of memory and insufficient memory allocation when executing a job can cause memory issues and job failures. I/O Estimator 407 model can be used to predict disk I/O and network I/O (sometimes generally referred to as I/O) resource requirements for a given job. These estimators can also provide insight on the nature of a job which can be helpful in setting up guardrails for job enhancements. Job can often be updated over a given time period by developers to add new features and such jobs can be versioned and maintained in the job version manager 206.

The compute engine 205 in the schedule manger 201 can aggregate batches (i.e., bundle, package, etc.) of jobs in a given schedule and provide a common deployment descriptor configuration to resource generator 210. Compute engine 205 can be configured to schedule instantiation of one or more job servers in runtime for a predefined periodicity (e.g., every 30 seconds) based on job request demand from customers/tenants. The final POD configuration for a given set of jobs in a schedule can be calculated by aggregating cloud compute metrics derived from CPU Estimator 405, memory estimator 406 and I/O estimator 407 for individual jobs. Job aggregator module 209 can help the compute engine 104 track jobs that can be packaged and deployed in in a single execution set. A deployment descriptor with a list of jobs to be executed in each batch is then published to a resource manager 110.

Resource manager 110 can create a POD deployment descriptor with the correct configuration based on metrics derived from the compute engine 205 for aggregated jobs in a given execution schedule. Kubernetes scheduler API 111 or a Hypervisor based resource creation API can be used to create a compute for a set of selected jobs (e.g., bundled jobs, packaged jobs, etc.) in a given schedule. The Kubernetes deployment descriptor can have an appropriate size for compute, memory, disk and network I/O based on the output of the (S)ARIMA compute predictor 105. An image of servers 109 can be pulled from a central docker image registry 108 and executed in any available node in Kubernetes cluster 113. Resource manager 110 can also allocate jobs in multiple containers in a given POD 113 when isolation of jobs is required. Jobs of similar type and from the same tenant can be provisioned in the same container on a given POD in a scheduled job execution. A scheduled job execution can be provided by either the job owners or a tenant administrator during provisioning to ensure a job is executed in predefined time schedule.

Figure 5:
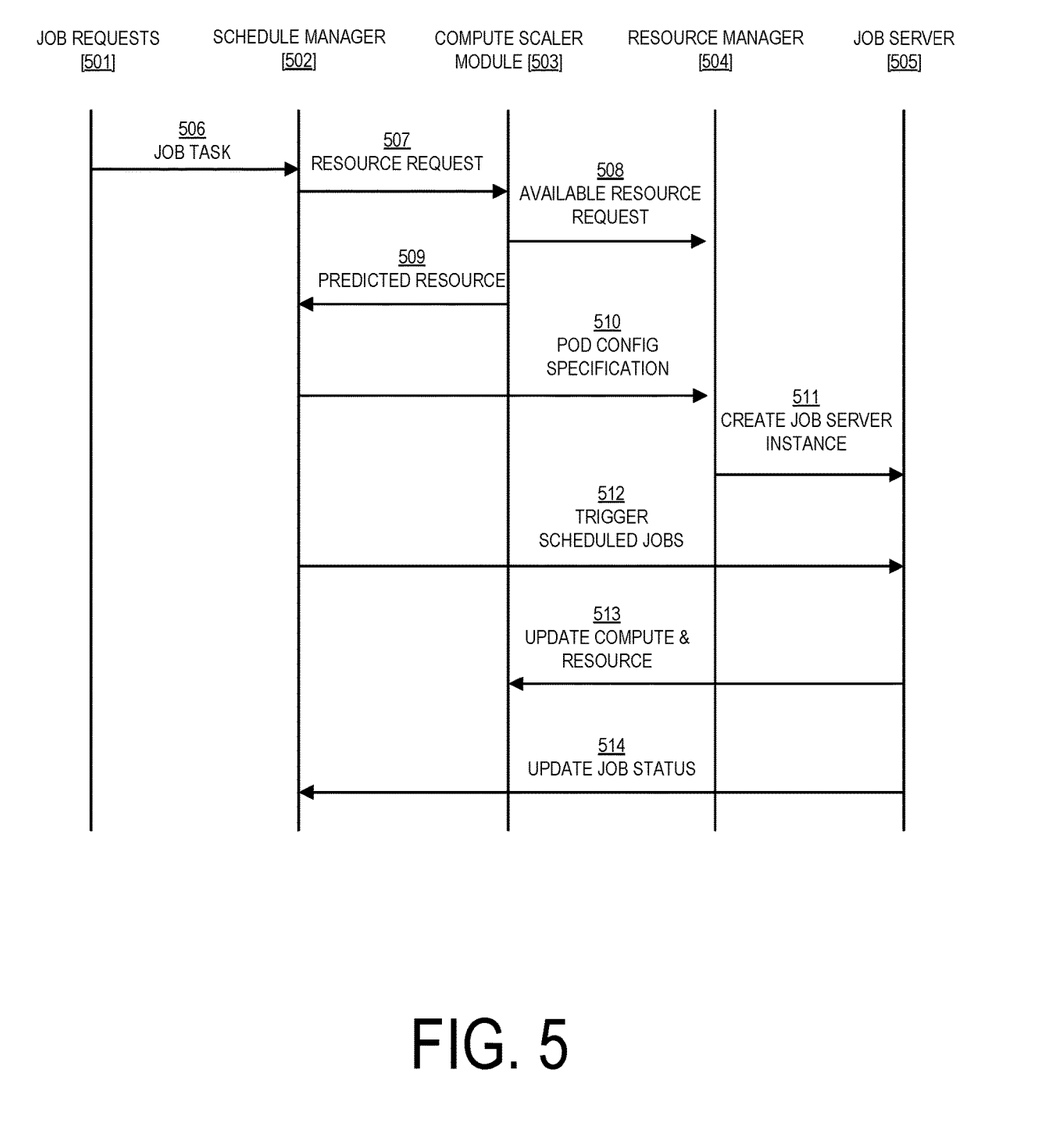
FIG. 5 is a sequencing diagram illustrating data flow among multiple functional components in an adaptive job schedule framework.

FIG. 5 is a data flow diagram among a job request module 501, a schedule manager 502, a compute scaler module 504, a resource manager 504, and a job server 505. Initially, at 506 a job task is sent to the schedule manager which, then, at 507, requests resources from the compute scaler module 503. The compute scaler module 503 then, at 508 requests available resources and, at 509 additionally provides a predicted resource consumption value to the schedule manager 503. The schedule manager 502 then, at 510, sends a specific POD (i.e., container) configuration specification to execute the job to the resource manager 504. The resource manager 504 then, at 511, creates a job server instance on the job server 505. The schedule manager 502 can then, at 512, trigger the scheduled jobs. The job server 505 additionally updates the compute and resource availability information, at 513, to the compute scaler module. Further, the job server 505, at 514, can update the schedule manager 502 regarding job status.

Figure 6:
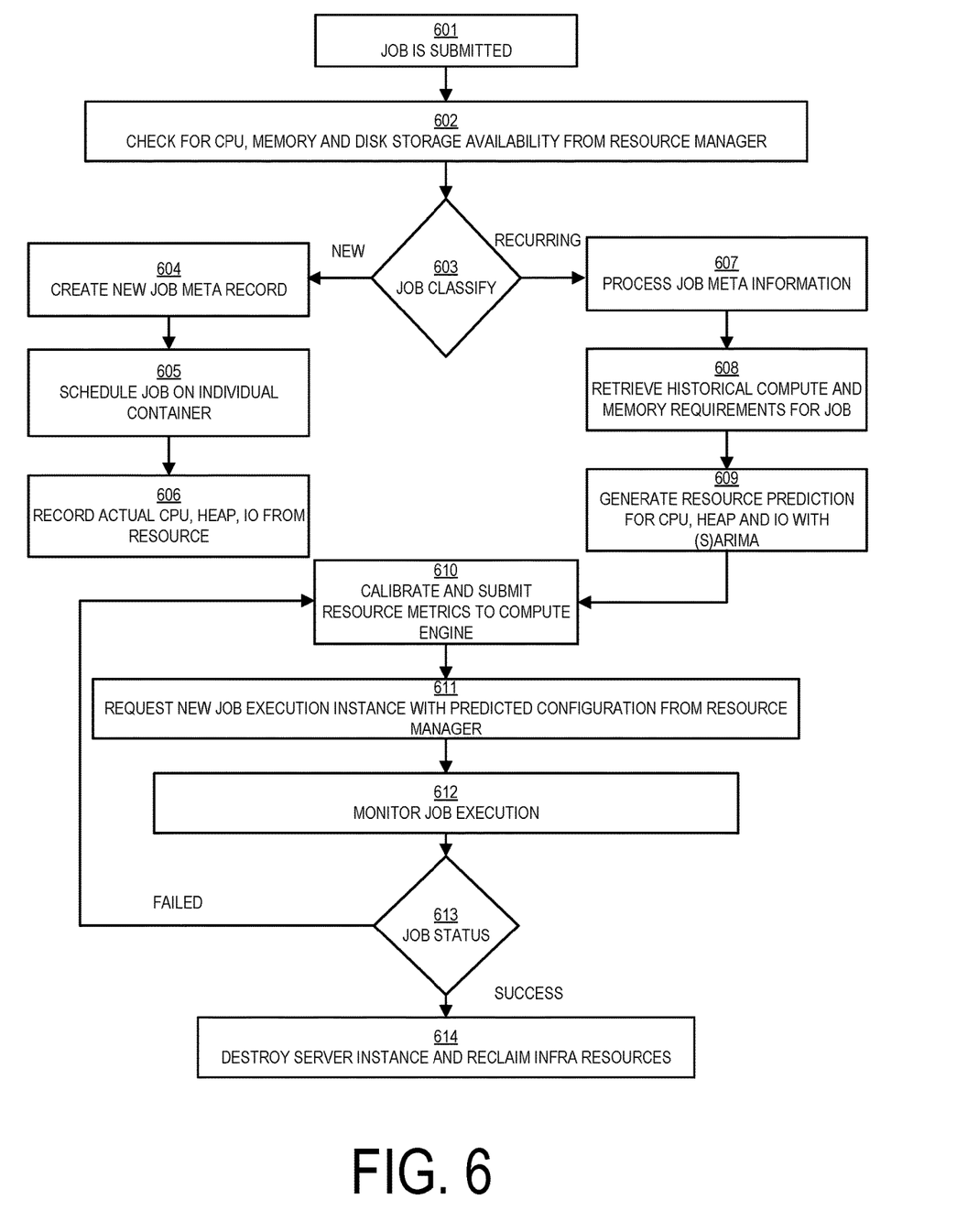
FIG. 6 is a process flow diagram illustrating job scheduling with resource prediction for new and recurring jobs.

FIG. 6 is a process flow diagram 600 in which, at 601, a job is initially submitted. Thereafter, at 602, available CPU, memory, and disk storage is checked with a resource manager. The job can then be classified, at 603, as being either new or recurring. If the job is new (e.g., there is no matching job tracker ID), then at 604, a meta record (e.g., a metadata record, etc.) for the job is created. The job can then be scheduled, at 605, and usage metrics (e.g., CPU, heap memory consumption, I/O and the like) can be monitored and added to the meta record. If the job is classified, at 603, as being recurring, then pre-existing job meta information 607 for that particular job type (e.g., matching job tracker ID) is processed so that, at 604, historical computer and memory requirements for the job type are obtained. Thereafter, at 609, using this information, a resource prediction for the amount of estimated CPU, heap memory, I/O to be consumed when executing the job is determined by a (S)ARIMA model. This resource prediction is then provided, at 610, to a compute engine which has various resource availability metrics. A new job instance is then requested, at 610, with a predicted configuration from the resource manager. The execution of the job can, at 612 be monitored and, at 613, the job status updated. Jobs can be scheduled for execution again in cases of failure. The job server instance can be destroyed, and the corresponding infrastructure resources can be recovered, at 614, in the case of a successful job execution.

Figure 7:
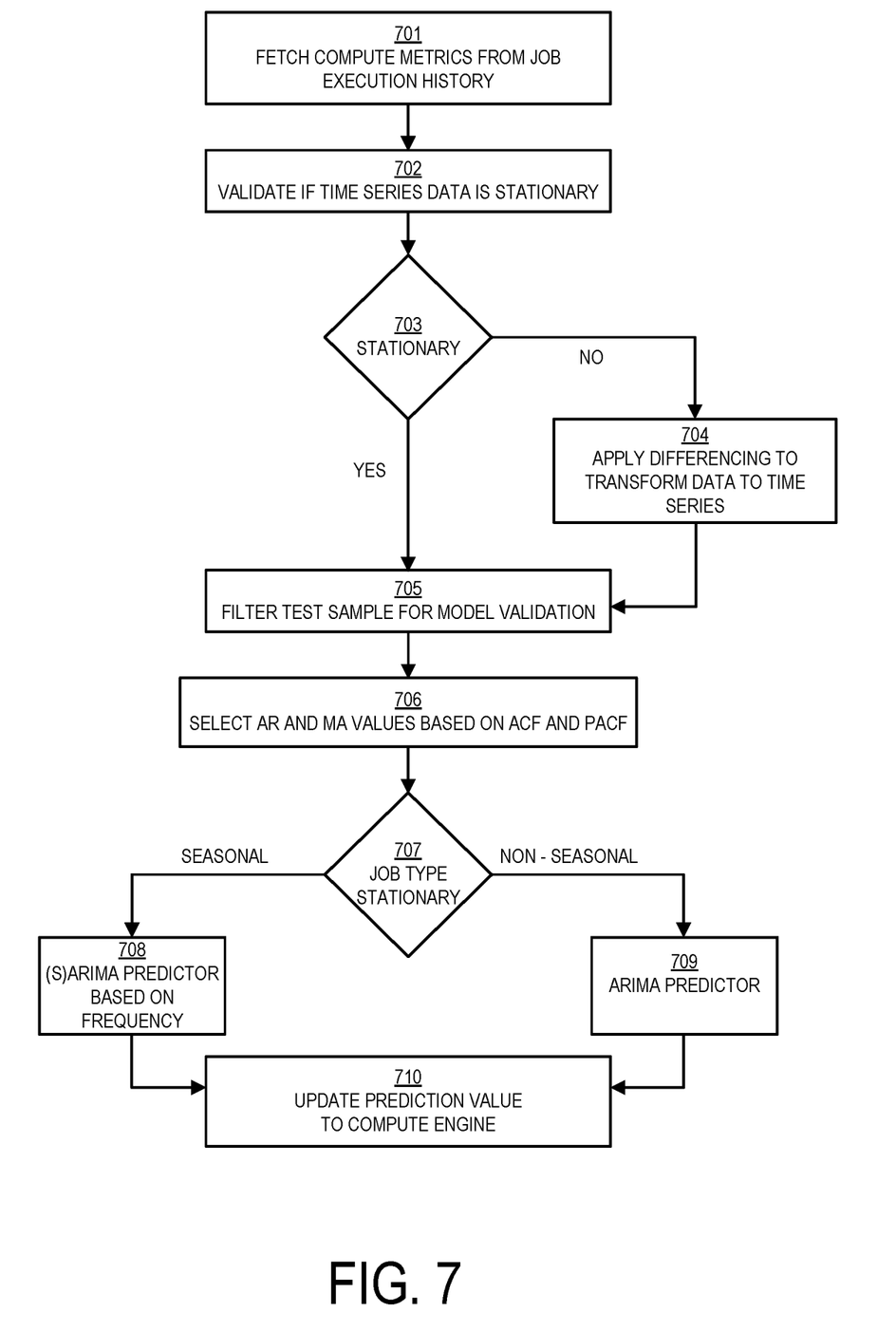
FIG. 7 is a process flow diagram with steps to compute and estimate job resource prediction using (S)ARIMA Model.

FIG. 7 is a process diagram illustrating aspects for estimating resources in which, at 701, compute metrics (i.e., resource consumption information, etc.) is fetched from a job execution history. Thereafter, at 702, it is validated whether the time series data in the fetched compute metrics are stationary. A time series is stationary when the mean, variance and autocorrelation of compute metrics are constant over given time period (S). If the data is not stationary, then at 704, differencing is applied to transform the data to recompute time series. Next, at 705, the test sample can be filtered for model validation. Autoregressive (AR) and Moving Average (MA) values can then, at 706, be selected based on ACF (Auto Correlation Function plot) and PACF (Partial Auto Correlation Function). Next, at 707, it is determined whether the job type is seasonal (i.e., recurring) or non-seasonal (i.e., non-recurring). If the job type is seasonal, then at 709, a (S)ARIMA predictor is used to estimate resources and if the job type is not seasonal, then at 709, an ARIMA predictor is used to estimate resources for the job type. These predictions are used, at 710, to update the prediction values used by the compute engine.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    receiving, by a cloud computing environment, a request to execute a job;
    determining computing resources available to execute the job;
    classifying the job as either new or recurring;
    performing a first process flow responsive to classifying the job as new; and
    performing a second process flow responsive to classifying the job as recurring,
    wherein the first process flow includes:
        creating a new job meta record for the job;
        scheduling the job to be executed; and
        monitoring resource usage metrics during execution of the job and adding the resource usage metrics to the new job meta record, and wherein the second process flow includes:
            processing pre-existing job metadata information characterizing aspects of the job including at least one of a job tracker ID, frequency, job type, schedule time or the resource usage metrics for the job, the processing of the pre-existing job metadata information including retrieving historical computing resource consumption information for the job;
        determining whether a job type of the job is seasonal or non-seasonal based on attributes of the job identified by parsing the pre-existing job metadata information, wherein seasonal jobs have a higher frequency of execution over non-seasonal jobs;
        generating, using an ensemble model (seasonal autoregressive integrated moving average (S)ARIMA model) that combines an autoregressive moving average (ARMA) model and an autoregressive integrated moving average (ARIMA) model, a resource prediction characterizing resources to be consumed when executing the job based on the determined computing resources and the retrieved historical information, wherein a (S)ARIMA predictor is selected to be used to apply the (S)ARIMA model to estimate the resources to be consumed if the job type is determined to be seasonal and an ARIMA predictor is selected to be used to apply the ARIMA model to estimate the resources to be consumed if the job type is determined to be non-seasonal;
        scheduling execution of the job by the cloud computing environment based on the generated resource prediction and the available computing resources to allocate capacity for the job in the cloud computing environment; and
        executing, by the cloud computing environment, the job in accordance with the scheduled execution.

2. The method of claim 1, wherein the determined computing resources comprise availability of one or more of:
    central processing unit (CPU), memory, disk storage, or I/O, and wherein the job is classified as new responsive to determining that there is no matching job tracker identifier for the job in a database.

3. The method of claim 1, wherein the historical information is retrieved using job metadata information associated with the job, wherein the historical information includes compute metrics, and wherein the method further comprises:
    validating whether time series data in the compute metrics are stationary, and
    applying differencing to transform and recompute the time series data.

4. The method of claim 1, wherein the scheduling comprises: requesting a new job execution instance to execute the job with the generated resource prediction.

5. The method of claim 1, wherein the job is executed by one or more servers forming part of a cloud computing environment.

6. The method of claim 5, wherein the cloud computing environment serves a plurality of tenants such that jobs from a particular tenant are executed within one or more containers isolated from other tenants.

7. The method of claim 1 further comprising:
    receiving a request to execute a new job that was not previously executed;
    scheduling execution of the new job; and
    monitoring resource consumption during execution of the new job.

8. The method of claim 7, wherein the scheduling of non-seasonal job uses the ARIMA model for compute and resource prediction.

9. The method of claim 1 further comprising:
generating metadata information based on the monitored resource consumption during execution of the new job, the metadata information being used to predict resource consumption at a subsequent time when the new job is again requested to be executed.

10. A computer-implemented method comprising:
receiving a plurality of requests to execute jobs within a cloud computing environment;
adding the plurality of requests to a request queue;
processing the plurality of requests in the request queue by:
   determining computing resources available to execute each job corresponding to the plurality of requests;
   determining, for each job, whether the job is seasonal or non-seasonal based on attributes of the job identified by parsing metadata information relating to the job, wherein the metadata information includes at least one of a job tracker ID, frequency, job type, schedule time or resource usage metrics for the job, and wherein seasonal jobs have a higher frequency of execution over non-seasonal jobs;
   retrieving historical computing resource consumption information for each seasonal job;
   for each job corresponding to the plurality of requests in the request queue, using either a seasonal autoregressive integrated moving average ((S)ARIMA) predictor or an autoregressive integrated moving average (ARIMA) predictor based on a seasonality of the request to generate, using an ensemble model ((S)ARIMA model) combining an autoregressive moving average (ARMA) model and an ARIMA model, a resource prediction for each job corresponding to the plurality of requests in the request queue characterizing resources to be consumed when executing such job based on the corresponding determined computing resources and the corresponding retrieved historical information, wherein generating the resource prediction for each job comprises selecting the (S)ARIMA) predictor to apply the (S)ARIMA model to estimate the resources to be consumed for each job having a seasonal job type, and selecting the ARIMA predictor to apply the ARIMA model to estimate the resources to be consumed for each job having a non-seasonal job type;
   generating a plurality of batches of jobs based on the generated resource predictions for the jobs and the available computing resources;
   scheduling execution of the plurality of batches of jobs by the cloud computing environment; and
   executing, by the cloud computing environment, the plurality of batches of jobs in accordance with the scheduled execution.

11. A system comprising:
at least one data processor; and
memory storing instructions which, when executed by the at least one data processor, result in operations comprising:
   receiving, by a cloud computing environment, a request to execute a job;
   determining computing resources available to execute the job;
   determining whether the job is seasonal or non-seasonal based on attributes of the job identified by parsing the metadata information relating to the job, wherein the metadata information includes at least one of a job tracker ID, frequency, job type, schedule time or resource usage metrics for the job, and wherein seasonal jobs have a higher frequency of execution over non-seasonal jobs;
   responsive to determining that the job is non-seasonal:
      using an ensemble model (seasonal autoregressive integrated moving average (S)ARIMA model) that combines an autoregressive moving average (ARMA) model and an autoregressive integrated moving average (ARIMA) model to generate a first estimate of resources to be consumed when executing the job by using an ARIMA predictor to apply the ARIMA model, and
      scheduling execution of the job by the cloud computing environment based on the first estimate and the available resources; and
   responsive to determining that the job is seasonal:
      retrieving historical computing resource consumption information for the job,
      using the ensemble model to generate a second estimate of resources to be consumed when executing the job by using a seasonal ARIMA ((S)ARIMA) predictor and the retrieved historical computing resource consumption information to apply the (S)ARIMA model, and
      scheduling execution of the job by the cloud computing environment based on the second estimate and the available computing resources; and
      executing, by the cloud computing environment, the job in accordance with the scheduled execution.

12. The system of claim 11, wherein the determined computing resources comprise availability of one or more of:
   central processing unit (CPU), memory, disk storage, or I/O.

13. The system of claim 11, wherein the historical information is retrieved using the metadata information relating to the job.

14. The system of claim 11, wherein the scheduling comprises:
   requesting a new job execution instance to execute the job with the generated resource prediction.

15. The system of claim 11, wherein the job is executed by one or more servers forming part of a cloud computing environment.

16. The system of claim 15, wherein the cloud computing environment serves a plurality of tenants such that jobs from a particular tenant are executed within one or more containers isolated from other tenants.

17. The system of claim 11, wherein the operations further comprise:
   receiving a request to execute a new job that was not previously executed;
   scheduling execution of the new job; and monitoring resource consumption during execution of the new job.

18. The system of claim 17, wherein the scheduling of the new job uses the ARIMA model.

19. The system of claim 17, wherein the operations further comprise:
   generating metadata information based on the monitored resource consumption during execution of the new job, the metadata information being used to predict resource consumption at a subsequent time when the new job is again requested to be executed.

20. The system of claim 11 further comprising:
a plurality of servers forming part of the cloud computing environment for executing the job.

* * * * *